(12) United States Patent
Lin et al.

(10) Patent No.: US 10,635,459 B2
(45) Date of Patent: Apr. 28, 2020

(54) USER INTERFACE VIRTUALIZATION FOR LARGE-VOLUME STRUCTURAL DATA

(71) Applicant: Microsoft Technology Licensing, LLC, Redmond, WA (US)

(72) Inventors: Ling Lin, Bothell, WA (US); Masato Maeda, Sammamish, WA (US); Harjinder Singh Dhadda, Everett, WA (US); Hong Tao Chen, Sammamish, WA (US); Jyotirmaya Tripathi, Sammamish, WA (US); Rayman Faruk Aeron, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 15/945,692

(22) Filed: Apr. 4, 2018

(65) Prior Publication Data
US 2019/0310869 A1  Oct. 10, 2019

(51) Int. Cl.
| | |
|---|---|
| *G06F 9/451* | (2018.01) |
| *G06F 16/26* | (2019.01) |
| *G06F 16/25* | (2019.01) |
| *G06F 16/22* | (2019.01) |
| *H04L 29/08* | (2006.01) |
| *G06F 16/185* | (2019.01) |

(52) U.S. Cl.
CPC .......... *G06F 9/452* (2018.02); *G06F 16/2264* (2019.01); *G06F 16/2272* (2019.01); *G06F 16/258* (2019.01); *G06F 16/26* (2019.01); *G06F 16/185* (2019.01); *G06F 16/2246* (2019.01); *H04L 67/10* (2013.01)

(58) Field of Classification Search
CPC ..... G06F 3/0486; G06F 16/2246; G06F 9/452
See application file for complete search history.

(56) References Cited

U.S. PATENT DOCUMENTS

| | | | |
|---|---|---|---|
| 8,612,243 B2 | 12/2013 | McGill et al. | |
| 8,823,710 B2 | 9/2014 | Dang et al. | |
| 10,037,350 B1* | 7/2018 | Seal | G06F 16/2246 |
| 2007/0234227 A1* | 10/2007 | Prinsen | G06F 3/0486 |
| | | | 715/769 |
| 2010/0131457 A1 | 5/2010 | Heimendinger | |
| 2012/0284664 A1 | 11/2012 | Zhao | |

OTHER PUBLICATIONS

"DesigningLarge Lists and Maximizing List Performance (SharePoint Server 2010)", Retrieved from<<https://technet.microsoft.com/en-us/library/cc262813(v=office.14).aspx>>, Sep. 24, 2011, 40 Pages.

(Continued)

*Primary Examiner* — Etienne P Leroux
(74) *Attorney, Agent, or Firm* — Davin Chin; Chin IP, PLLC

(57) ABSTRACT

In one example, a multi-dimensional data set is converted into a single-dimensional data set that includes structural information associated with the multi-dimensional data set, such that root nodes and each node in the single-dimensional node for which each ancestor node of the node is an expanded node is assigned a reference. A view is caused to be displayed, including using the single-dimensional data set to render at least a selected portion of the single-dimensional data set.

20 Claims, 14 Drawing Sheets

(56) References Cited

OTHER PUBLICATIONS

"FlatList", Retrieved from <<https://web.archive.org/web/20170929071259/https:/facebook.github.io/react-native/docs/flatlist.html>>, Sep. 29, 2017, 6 Pages.
"Using List Views", Retrieved from<<https://facebook.github.io/react-native/docs/using-a-listview.html>>, Dec. 13, 2017, 2 Pages.
Bot, et al., "Optimizing Performance: Controls", Retrieved from<<https://docs.microsoft.com/en-us/dotnet/framework/wpf/advanced/optimizing-performance-controls>>, Mar. 30, 2017, 4 Pages.
Shekhawat, Sandeep Singh, "Rendering a Partial View and JSON Data Using AJAX in ASP.NET MVC", Retrieved from<<https://www.codeproject.com/Articles/748842/Rendering-a-Partial-View-and-JSON-Data-Using-AJAX>>, Sep. 18, 2014, 9 Pages.

\* cited by examiner

| CONTRACT NAME | COMPANY NAME | CONTACT TITLE | ADDRESS | POSTAL CODE | COUNTRY | PHONE | FAX |
|---|---|---|---|---|---|---|---|
| ∨ BERLIN COUNT: 1 | | | | | | | |
| MARIA ANDERS | ALFREDS FUTTERKI... | ⌧ SALES RE... | OBERE STR. 57 | 12209 | GERMANY | 030-0074321 | 030-0 |
| ∨ MEXICO D.F. COUNT: 5 | | | | | | | |
| ANA TRUJILLO | ANA TRUJILLO EM... | ⌧ OWNER | AVDA. DE LA CON... | 05021 | MEXICO | (5) 555-4729 | (5) 55 |
| ANTONIO MO... | ANTONIO MOREN... | ⌧ OWNER | MATADEROS 2312 | 05023 | MEXICO | (5) 555-3992 | |
| FRANSISCO CH... | CENTRO COMERCI... | ⌧ MARKETI... | SIERRAS DE GRAN... | 05022 | MEXICO | (5) 555-3392 | (5) 55 |
| GUILLERMO FE... | PERICLES COMIDA... | ⌧ SALES RE... | CALLE DR. JORGE... | 05033 | MEXICO | (5) 552-3745 | |
| MIGUEL ANG... | TORTUGA RESTAUR... | ⌧ OWNER | AVDA. AZTECA 123 | 05033 | MEXICO | (5) 555-2933 | |
| > LONDON COUNT: 6 | | | | | | | |
| ∨ LULEA COUNT: 1 | | | | | | | |
| CHRISTINA BER... | BERGLUNDS SNAB... | ⌧ ORDER A... | BERGUVSVAGEN 8 | S-958 22 | SWEDEN | 0921-12 34 65 | 0921- |
| ∨ MANNHEIM COUNT: 1 | | | | | | | |
| HANNA MOOS | BLAUER SEE DELIK... | ⌧ SALES RE... | FORSTERSTR. 57 | 68306 | GERMANY | 0621-08460 | 0621- |

*FIG. 9*

0: {data: "level5 0", expanded: true, children: Array(0)}

```
▼ {data: "root", expanded: true, children: Array(15)}
  ▼ children: Array(15)
    ▼ 0:
      ▼ children: Array(15)
        ▼ 0:
          ▼ children: Array(15)
            ▼ 0:
              ▼ children: Array(15)
                ▶ 0: {data: "level5 0", expanded: true, children: Array(0)}
                ▶ 1: {data: "level5 1", expanded: true, children: Array(0)}
                ▶ 2: {data: "level5 2", expanded: true, children: Array(0)}
                ▶ 3: {data: "level5 3", expanded: true, children: Array(0)}
                ▶ 4: {data: "level5 4", expanded: true, children: Array(0)}
                ▶ 5: {data: "level5 5", expanded: true, children: Array(0)}
                ▶ 6: {data: "level5 6", expanded: true, children: Array(0)}
                ▶ 7: {data: "level5 7", expanded: true, children: Array(0)}
                ▶ 8: {data: "level5 8", expanded: true, children: Array(0)}
                ▶ 9: {data: "level5 9", expanded: true, children: Array(0)}
                ▶ 10: {data: "level5 10", expanded: true, children: Array(0)}
                ▶ 11: {data: "level5 11", expanded: true, children: Array(0)}
                ▶ 12: {data: "level5 12", expanded: true, children: Array(0)}
                ▶ 13: {data: "level5 13", expanded: true, children: Array(0)}
                ▶ 14: {data: "level5 14", expanded: true, children: Array(0)}
                  length: 15
                ▶ _oroto_: Array(0)
                data: "level4 0"
                expanded: true
              ▶ _oroto_: Object
            ▶ 1: {data: "level4 1", expanded: true, children: Array(15)}
            ▶ 2: {data: "level4 2", expanded: true, children: Array(15)}
            ▶ 3: {data: "level4 3", expanded: true, children: Array(15)}
            ▶ 4: {data: "level4 4", expanded: true, children: Array(15)}
            ▶ 5: {data: "level4 5", expanded: true, children: Array(15)}
            ▶ 6: {data: "level4 6", expanded: true, children: Array(15)}
            ▶ 7: {data: "level4 7", expanded: true, children: Array(15)}
            ▶ 8: {data: "level4 8", expanded: true, children: Array(15)}
            ▶ 9: {data: "level4 9", expanded: true, children: Array(15)}
            ▶ 10: {data: "level4 10", expanded: true, children: Array(15)}
            ▶ 11: {data: "level4 11", expanded: true, children: Array(15)}
            ▶ 12: {data: "level4 12", expanded: true, children: Array(15)}
            ▶ 13: {data: "level4 13", expanded: true, children: Array(15)}
            ▶ 14: {data: "level4 14", expanded: true, children: Array(15)}
              length: 15
            ▶ _oroto_: Array(0)
            data: "level4 0"
            expanded: true
          ▶ _oroto_: Object
        ▶ 1: {data: "level3 1", expanded: true, children: Array(15)}
        ▶ 2: {data: "level3 2", expanded: true, children: Array(15)}
        ▶ 3: {data: "level3 3", expanded: true, children: Array(15)}
        ▶ 4: {data: "level3 4", expanded: true, children: Array(15)}
        ▶ 5: {data: "level3 5", expanded: true, children: Array(15)}
        ▶ 6: {data: "level3 6", expanded: true, children: Array(15)}
        ▶ 7: {data: "level3 7", expanded: true, children: Array(15)}
        ▶ 8: {data: "level3 8", expanded: true, children: Array(15)}
        ▶ 9: {data: "level3 9", expanded: true, children: Array(15)}
```

*FIG. 10*

- ▶ 0: {data: "root", type: 3, depth: 0, hasChildren: true, node: {...}, ...}
- ▶ 1: {data: "level1 0", type: 3, depth: 1, hasChildren: true, node: {...}, ...}
- ▶ 2: {data: "level2 0", type: 3, depth: 2, hasChildren: true, node: {...}, ...}
- ▶ 3: {data: "level3 0", type: 3, depth: 3, hasChildren: true, node: {...}, ...}
- ▼ 4:
  - data: "level4 0"
  - depth: 4
  - hasChildren: true
  - index: 4
  - positionInSet: 1
  - setSize: 15
  - type: 3
  - ▼ node:
    - ▶ children: (15) [{...}, {...}, {...}, {...}, {...}, {...}, {...}, {...}, {...}, {...}, {...}, {...}, {...}, {...}, {...}]
    - data: "level4 0"
    - expanded: true
    - isLeaf: false
    - ▶ parent: {data: "level3 0", expanded: true, children: Array(15), parent: {...}, isLeaf:
    - ▶ __proto__: Object
  - ▶ __proto__: Object
- ▶ 5: {data: "level5 0", type: 3, depth: 5, hasChildren: true, node: {...}, ...}
- ▶ 6: {data: "level5 1", type: 3, depth: 5, hasChildren: true, node: {...}, ...}
- ▶ 7: {data: "level5 2", type: 3, depth: 5, hasChildren: true, node: {...}, ...}
- ▶ 8: {data: "level5 3", type: 3, depth: 5, hasChildren: true, node: {...}, ...}
- ▶ 9: {data: "level5 4", type: 3, depth: 5, hasChildren: true, node: {...}, ...}
- ▶ 10: {data: "level5 5", type: 3, depth: 5, hasChildren: true, node: {...}, ...}
- ▶ 11: {data: "level5 6", type: 3, depth: 5, hasChildren: true, node: {...}, ...}
- ▶ 12: {data: "level5 7", type: 3, depth: 5, hasChildren: true, node: {...}, ...}
- ▶ 13: {data: "level5 8", type: 3, depth: 5, hasChildren: true, node: {...}, ...}
- ▶ 14: {data: "level5 5", type: 3, depth: 5, hasChildren: true, node: {...}, ...}
- ▶ 15: {data: "level5 10", type: 3, depth: 5, hasChildren: true, node: {...}, ...}
- ▶ 16: {data: "level5 11", type: 3, depth: 5, hasChildren: true, node: {...}, ...}
- ▶ 17: {data: "level5 12", type: 3, depth: 5, hasChildren: true, node: {...}, ...}
- ▶ 18: {data: "level5 13", type: 3, depth: 5, hasChildren: true, node: {...}, ...}
- ▶ 19: {data: "level5 14", type: 3, depth: 5, hasChildren: true, node: {...}, ...}
- ▶ 20: {data: "level5 1", type: 3, depth: 4, hasChildren: true, node: {...}, ...}
- ▶ 21: {data: "level5 0", type: 3, depth: 5, hasChildren: true, node: {...}, ...}
- ▶ 22: {data: "level5 1", type: 3, depth: 5, hasChildren: true, node: {...}, ...}
- ▶ 23: {data: "level5 2", type: 3, depth: 5, hasChildren: true, node: {...}, ...}
- ▶ 24: {data: "level5 3", type: 3, depth: 5, hasChildren: true, node: {...}, ...}
- ▶ 25: {data: "level5 4", type: 3, depth: 5, hasChildren: true, node: {...}, ...}
- ▶ 26: {data: "level5 5", type: 3, depth: 5, hasChildren: true, node: {...}, ...}
- ▶ 27: {data: "level5 6", type: 3, depth: 5, hasChildren: true, node: {...}, ...}
- ▶ 28: {data: "level5 7", type: 3, depth: 7, hasChildren: true, node: {...}, ...}
- ▶ 29: {data: "level5 8", type: 3, depth: 5, hasChildren: true, node: {...}, ...}
- ▶ 30: {data: "level5 9", type: 3, depth: 5, hasChildren: true, node: {...}, ...}
- ▶ 31: {data: "level5 10", type: 3, depth: 5, hasChildren: true, node: {...}, ...}
- ▶ 32: {data: "level5 11", type: 3, depth: 5, hasChildren: true, node: {...}, ...}
- ▶ 33: {data: "level5 12", type: 3, depth: 5, hasChildren: true, node: {...}, ...}
- ▶ 34: {data: "level5 13", type: 3, depth: 5, hasChildren: true, node: {...}, ...}
- ▶ 35: {data: "level5 14", type: 3, depth: 5, hasChildren: true, node: {...}, ...}
- ▶ 36: {data: "level5 15", type: 3, depth: 4, hasChildren: true, node: {...}, ...}
- ▶ 37: {data: "level5 16", type: 3, depth: 5, hasChildren: true, node: {...}, ...}

*FIG. 12*

| Sample html rendering for flat end data | ```html
<table _ngcontent-c9 class= "scroll-data sme-table-virtualized" aria-rowcount="813616"
  <tbody _ngcontent-c9>
    <!---bindings={
      "ng-reflect-ng-for-of": "[object Object], [object Object"
    }-->
    <tr _ngcontent-c9 class="item data" ng-reflect-klass="item data" ng-reflect-ng-cla
     "1" aria-posinset="1">...</tr>
    <tr _ngcontent-c9 class="item data" ng-reflect-klass="item data" ng-reflect-ng-cla
     "15" aria-posinset="1">...</tr>
    <tr _ngcontent-c9 class="item data" ng-reflect-klass="item data" ng-reflect-ng-cla
     "15" aria-posinset="1">...</tr>
    <tr _ngcontent-c9 class="item data" ng-reflect-klass="item data" ng-reflect-ng-cla
     "15" aria-posinset="1">...</tr>
    <tr _ngcontent-c9 class="item data" ng-reflect-klass="item data" ng-reflect-ng-cla
     "15" aria-posinset="1">...</tr>
    <tr _ngcontent-c9 class="item data" ng-reflect-klass="item data" ng-reflect-ng-cla
     "15" aria-posinset="1">...</tr>
    <tr _ngcontent-c9 class="item data" ng-reflect-klass="item data" ng-reflect-ng-cla
     "15" aria-posinset="2">...</tr>
    <tr _ngcontent-c9 class="item data" ng-reflect-klass="item data" ng-reflect-ng-cla
     "15" aria-posinset="3">...</tr>
    <tr _ngcontent-c9 class="item data" ng-reflect-klass="item data" ng-reflect-ng-cla
     "15" aria-posinset="4">...</tr>
    <tr _ngcontent-c9 class="item data" ng-reflect-klass="item data" ng-reflect-ng-cla
     "15" aria-posinset="5">...</tr>
    <tr _ngcontent-c9 class="item data" ng-reflect-klass="item data" ng-reflect-ng-cla
     setsize="15" aria-posinset="6">...</tr>
    <tr _ngcontent-c9 class="item data" ng-reflect-klass="item data" ng-reflect-ng-cla
     setsize="15" aria-posinset="7">...</tr>
    <tr _ngcontent-c9 class="item data" ng-reflect-klass="item data" ng-reflect-ng-cla
     setsize="15" aria-posinset="8">...</tr>
    <tr _ngcontent-c9 class="item data" ng-reflect-klass="item data" ng-reflect-ng-cla
     setsize="15" aria-posinset="9">...</tr>
    <tr _ngcontent-c9 class="item data" ng-reflect-klass="item data" ng-reflect-ng-cla
     setsize="15" aria-posinset="10">...</tr>
    <tr _ngcontent-c9 class="item data" ng-reflect-klass="item data" ng-reflect-ng-cla
     setsize="15" aria-posinset="11">...</tr>
    <tr _ngcontent-c9 class="item data" ng-reflect-klass="item data" ng-reflect-ng-cla
     setsize="15" aria-posinset="12">...</tr>
    <tr _ngcontent-c9 class="item data" ng-reflect-klass="item data" ng-reflect-ng-cla
     setsize="15" aria-posinset="13">...</tr>
    <tr _ngcontent-c9 class="item data" ng-reflect-klass="item data" ng-reflect-ng-cla
     setsize="15" aria-posinset="14">...</tr>
    <tr _ngcontent-c9 class="item" style="display: none;">...</tr> == $0
  </tbody>
</table>
``` |
|---|---|

*FIG. 13*

USER INTERFACE VIRTUALIZATION FOR LARGE-VOLUME STRUCTURAL DATA

BACKGROUND

Large-volume data may sometimes be organized in a hierarchical, multi-dimensioned format, such as a tree structure with collapsible nodes. Each element of a tree structure may be referred to as a node. Some nodes have a parent-child relationship. That is, a parent node is connected to each of its child nodes, and each child node is one step lower in the hierarchy than its parent. A child node may itself be a parent node to other children nodes. A descendent node is a node reachable by proceeding one or more times from parent to child. A group of nodes within the same parent are sibling nodes. A tree may have one root node which is at the highest level of the hierarchy.

A tree structure may be rendered, for example, by a web browser. The tree structure may have nodes that are collapsible by a user. When a node is collapsed by the user, all of the descendent nodes of the collapsed node are not displayed. A user may also expand a collapsed node, causing the children nodes of the expanded node to be displayed. The children node of the expanded node are then collapsed, but these collapsed nodes may also be expanded by the user. When multiple-dimensional data such as data in a tree structure is rendered in a browser, the rendering is typically accomplished by mapping the html structure to the data structure.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to displaying large data sets. In some examples, a multi-dimensional data set is converted into a single-dimensional data set that includes structural information associated with the multi-dimensional data set, such that root nodes and each node in the single-dimensional node for which each ancestor node of the node is an expanded node is assigned a reference. In some examples, a view is caused to be displayed, including using the single-dimensional data set to render at least a selected portion of the single-dimensional data set.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which:

FIG. 9 illustrates an example of a group listing view data;

FIG. 10 illustrates an example of sample data for the tree structure illustrated in FIG. 7;

FIG. 12 shows example "flattened" data that is the of the output of a multi-dimensional to single-dimensional conversion;

FIG. 13 shows an example of html rendering for the flattened data of FIG. 12.

DETAILED DESCRIPTION

Figure 1:
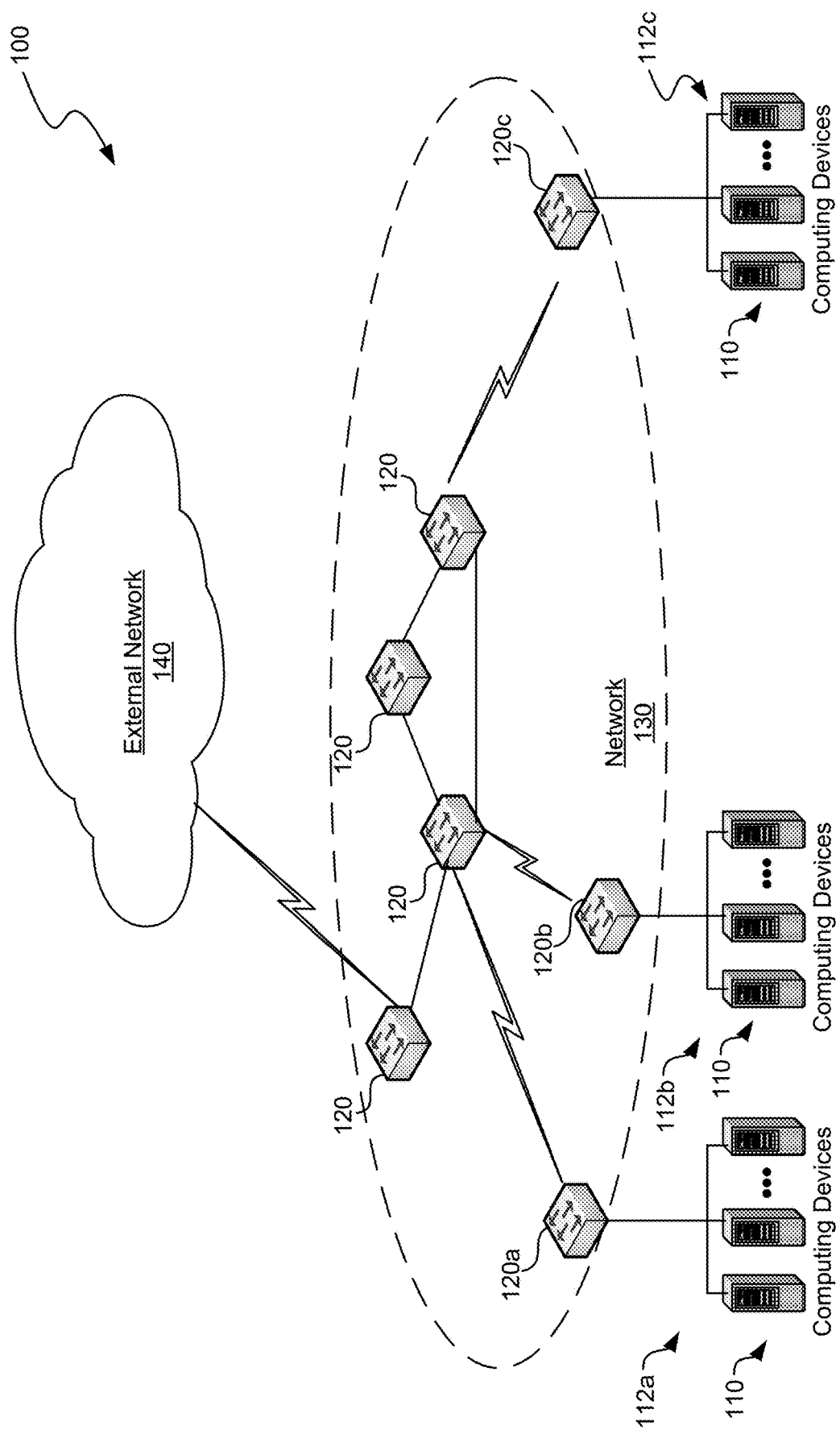
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to displaying large data sets. In some examples, a multi-dimensional data set is converted into a single-dimensional data set that includes structural information associated with the multi-dimensional data set, such that root nodes and each node in the single-dimensional node for which each ancestor node of the node is an expanded node is assigned a reference. In some examples, a view is caused to be displayed, including using the single-dimensional data set to render at least a selected portion of the single-dimensional data set.

In some examples, a browser renders a hierarchical, multi-dimensional data set. Rather than mapping the html structure to the data structure, in some examples, the multi-dimensional data set is converted into a single-dimensional data set that maintains the structural information of the multi-dimensional data set.

When the data is displayed, some nodes may be collapsed, meaning that descendent nodes of the collapsed node are not displayed. In some examples, when the multi-dimensional data is converted into single-dimensional data, each node that is not a descendant node of a collapsed node is assigned a reference, where the reference acts as a unique identifier for the node. As one example, a reference in the C programming language may be implemented using pointers (memory address of an object).

In some examples, the single-dimensional data is then rendered as follows. The view model is rendered by rendering that portion of the list that will be visible to the viewer. The rendering start and end of the view model is determined based on the view port location and size, using the assigned references. Then, based on the structural and data information, the view model is rendered.

The view model may then be incrementally updated when the view changes, such as added and removed nodes, collapsing a node, expanding a node, and/or the like.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110 and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112*a*-112*c*. In the illustrated example, each of host sets 112*a*-112*c* is operatively coupled to a corresponding network node 120*a*-120*c*, respectively, which are commonly referred to as "top-of-rack" or "TOR" network nodes. TOR network nodes 120*a*-120*c* can then be operatively coupled to additional network nodes 120 to form a computer network in a hierarchical, flat, mesh, or other suitable types of topology that allows communications between computing devices 110 and external network 140. In other examples, multiple host sets 112*a*-112*c* may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
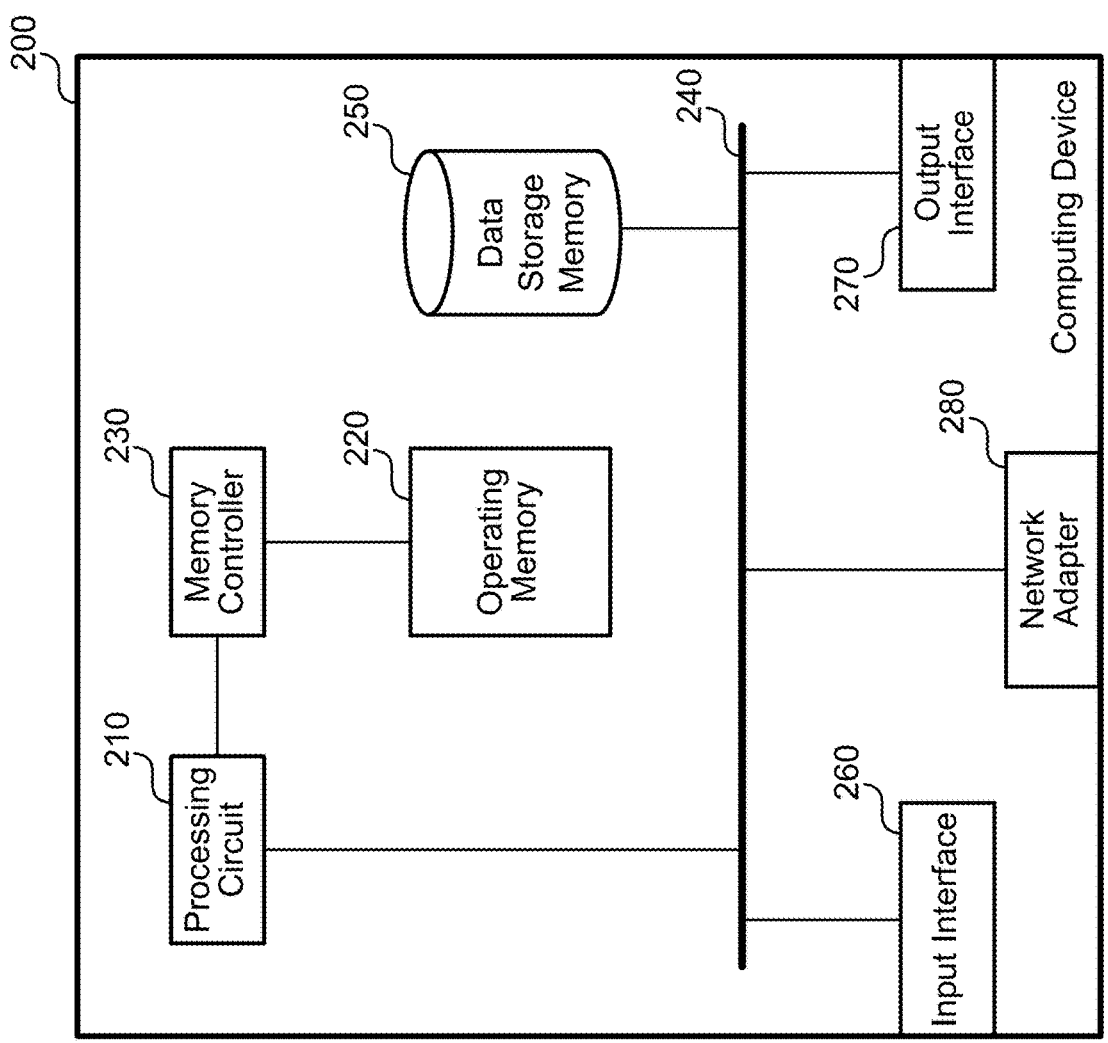
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
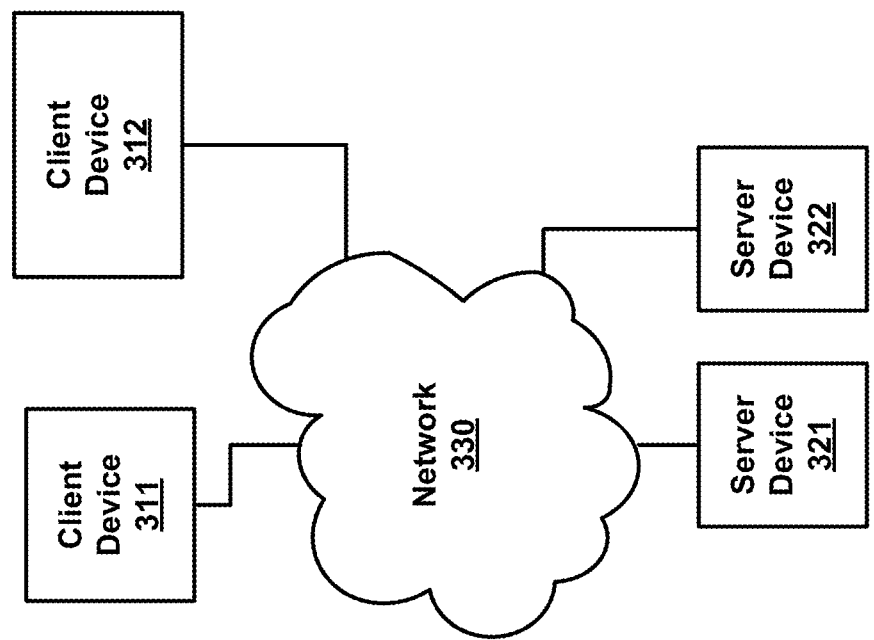
FIG. 3 is a block diagram illustrating an example of a system.

FIG. 3 is a block diagram illustrating an example of a system (300). System 300 may include network 330, as well as client device 311 and 312, and server device 321 and 322, which all may connect to network 330.

Each of the client devices 311 and 312 and server device 321 and 322 may include examples of computing device 200 of FIG. 2. FIG. 3 and the corresponding description of FIG.

3 in the specification illustrates an example system for illustrative purposes that does not limit the scope of the disclosure.

Devices 311, 312, 321, and 322 may each include virtually any device that is configured to perform computation and that is capable of sending and receiving data communications by way of one or more wired and/or wireless communication interfaces. Devices 311, 312, 321, and 322 may be configured to communicate using any of a variety of network protocols. For example, server devices 321 and 322 may be configured to execute a web server application that employs a protocol such as HTTP or HTTPS to communicate information, such as a web page, across network 330 to one or more client devices such as client devices 311 and 312.

Client devices 311 and 312 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. In addition, in at least one embodiment, client devices 311 and 312 may also provide information, such as a MAC address, IP address, or the like, useable to determine its physical location.

A client device may be a mobile device. Generally, mobile devices may include virtually any portable computing device capable of receiving and sending a message over a network, such as network 330, or the like. Mobile devices may also be described generally as client devices that are configured to be portable. Thus, mobile devices may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In some examples, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices also may include at least one other client application that is configured to receive content from another computing device. The client application may include a capability to provide and receive textual content, graphical content, audio content, and the like. The client application may further provide information that identifies itself, including a type, capability, name, and the like. In some examples, mobile devices may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like. Moreover, mobile devices may further provide information associated with its physical location to another computing device.

Mobile devices may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, or the like, and/or virtually any other message protocol may be employed.

Mobile devices may be further configured to enable a user to participate in communications sessions, such as IM sessions. As such, mobile devices may include a client application that is configured to manage various actions on behalf of the client device. For example, the client application may enable a user to interact with the browser application, email application, IM applications, SMS application, and the like.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication technology by which information may travel between client devices 311 and 312 and server device 321 and 322. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
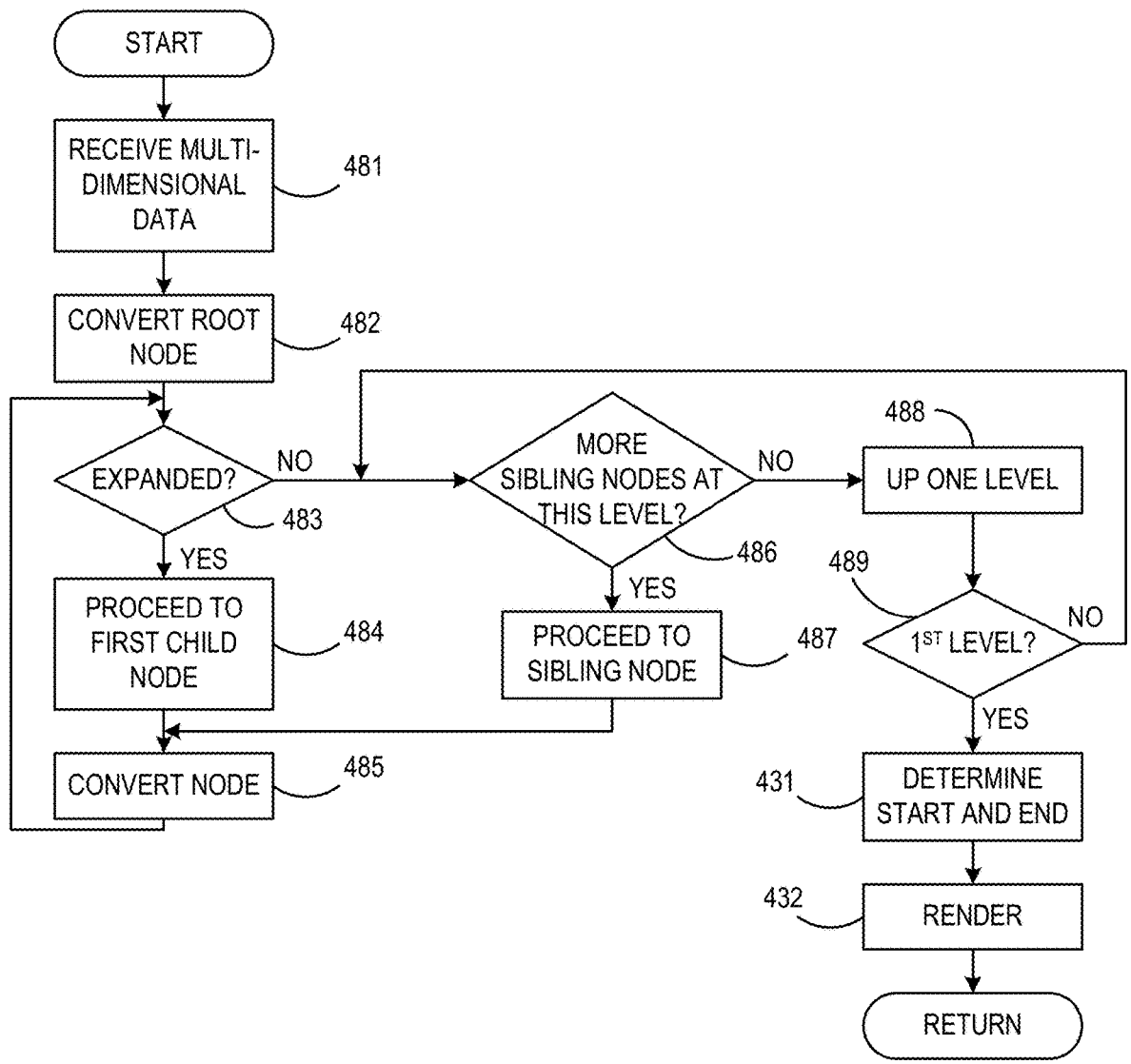
FIG. 4 is an example dataflow for a process.

FIG. 4 is an example dataflow for a process (480). In some examples, process 480 is performed by a computing device, e.g., computing device 110 of FIG. 1, computing device 200 of FIG. 2, or client device 311 or 312 of FIG. 3. Process 480 may provide user interface (UI) virtualization of a hierarchical multi-dimensional data set by first converting the multi-dimensional data set into a single-dimensional view model that retains the structural information of the multi-dimensional data set, and then rendering the single-dimensional view model. In some examples, with UI virtualization, the data to be displayed in the viewport is rendered, rather than rendering all of the data.

Some data sets involve data having a structure with one or more hierarchical levels. For example, a data set may involve a date for each element of the set, where the date is divided into years, years are divided into months, months are divided into weeks, and so on. As another example, a data set may involve the physical location of elements in the United States, where the location includes a state, the state is divided into counties, the counties are divided into cities, and so on. As another example, a data set may involve a file location, where the file location may include a folder, a sub-folder of the folder, a sub-folder of the sub-folder, and so on. A student list may be grouped by classrooms, and the classrooms may be grouped into students in each classroom, so that the student list has two hierarchical levels.

In the example data sets described above, the hierarchical levels are referred to as dimensions of the data set. For example, a student list that is grouped by classrooms, with the classroom grouped into students each classroom, is a two-dimensional data set with the first dimension being classroom, and the second dimension being students. A single-dimensional data set is a data set that that has only one dimension rather than being grouped in a hierarchical structure with multiple levels.

In the illustrated example, step 481 occurs first. At step 481, in some examples, a hierarchical multi-dimensional data set is received. In some examples, the data set is received by a client browser from a web server. In other examples, the data set may be retrieved by an application on the client, such as a spreadsheet, from client memory, or from the cloud.

There may be many different types of hierarchical, multi-dimensional data sets that can be received at step 481 in various examples. In some examples, the multi-dimensional data set may be intended for rendering in a tree structure with collapsible nodes. An example of such a data structure is illustrated in FIG. 5.

Figure 5:
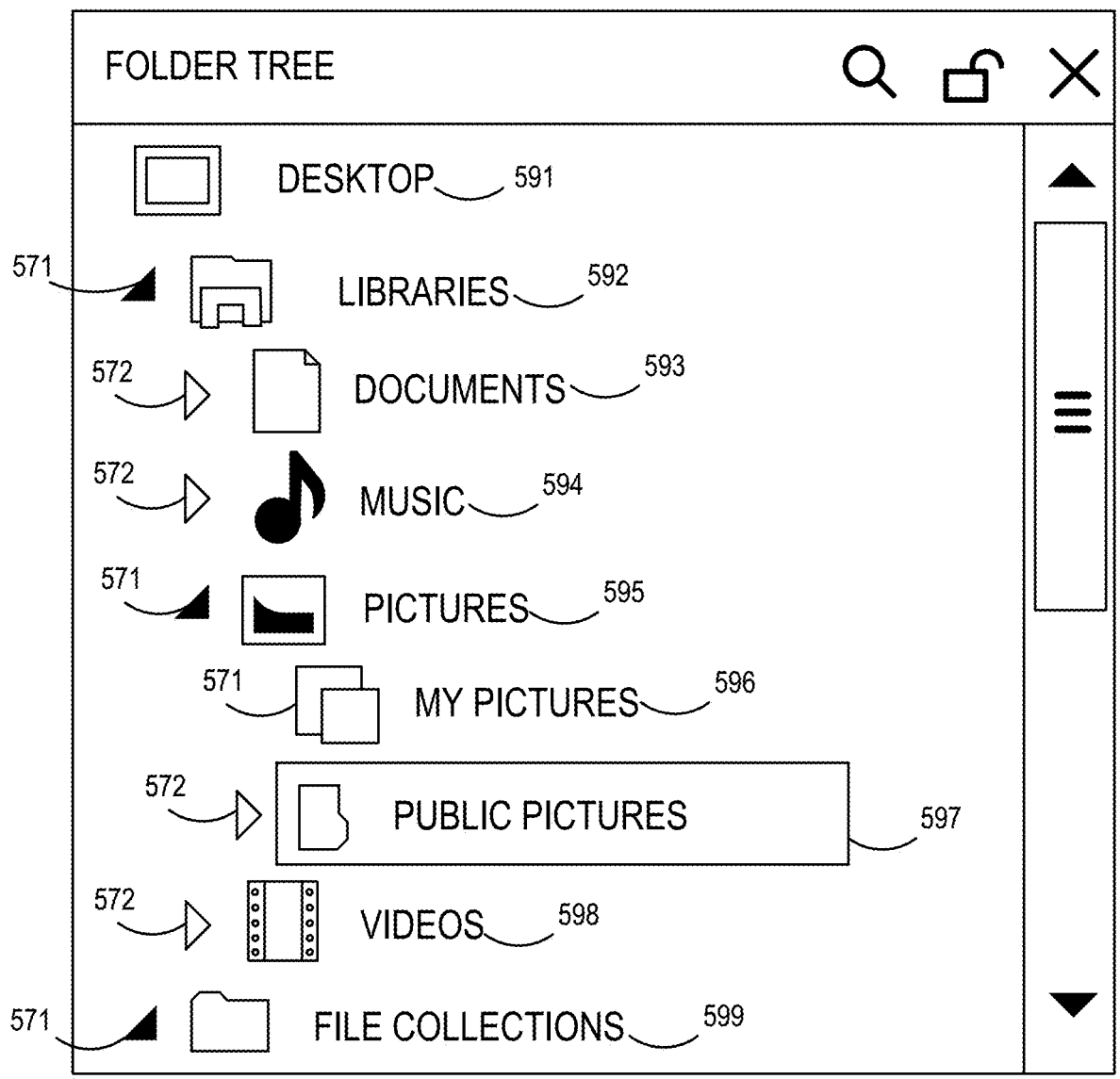
FIG. 5 illustrates an example display of a portion of a multi-dimensional data set as a tree with collapsible nodes.

FIG. 5 illustrates an example display of a multi-dimensional data set as a tree 590 with collapsible nodes. The example in FIG. 5 shows nodes 591-599 and icons 571 and 572, further described below as one example with reference to FIG. 4.

Figure 7:
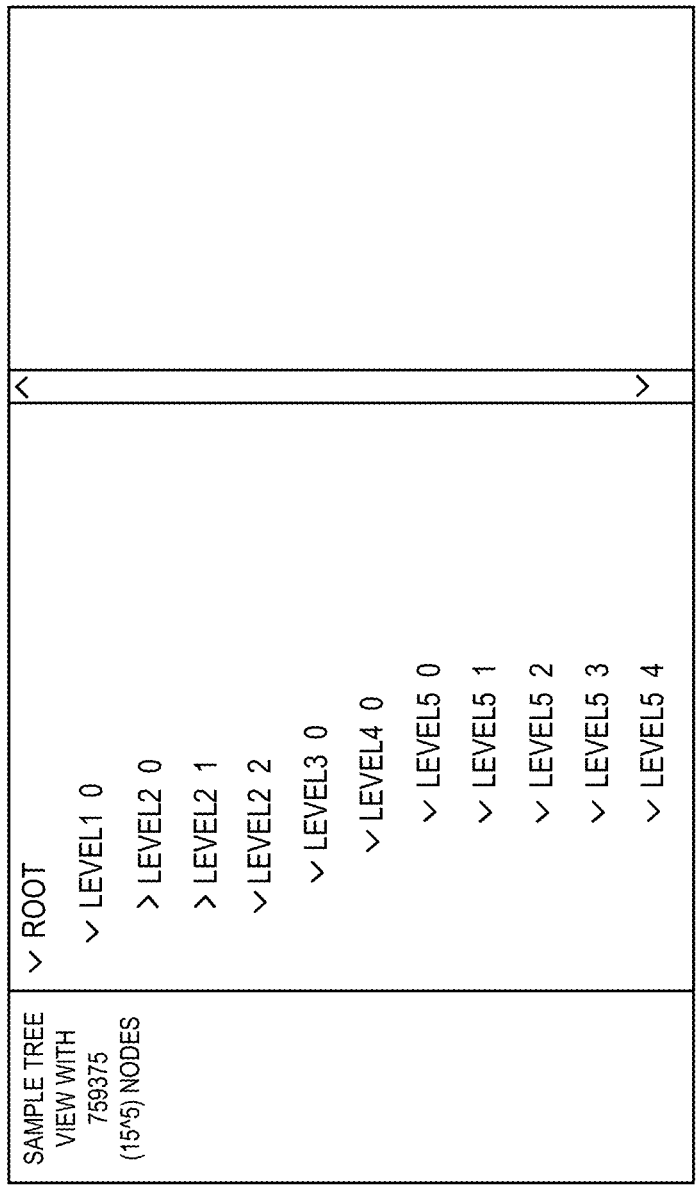
FIG. 7 illustrates another example display of a portion of a multi-dimensional data set as a tree with collapsible nodes.
Figure 8:
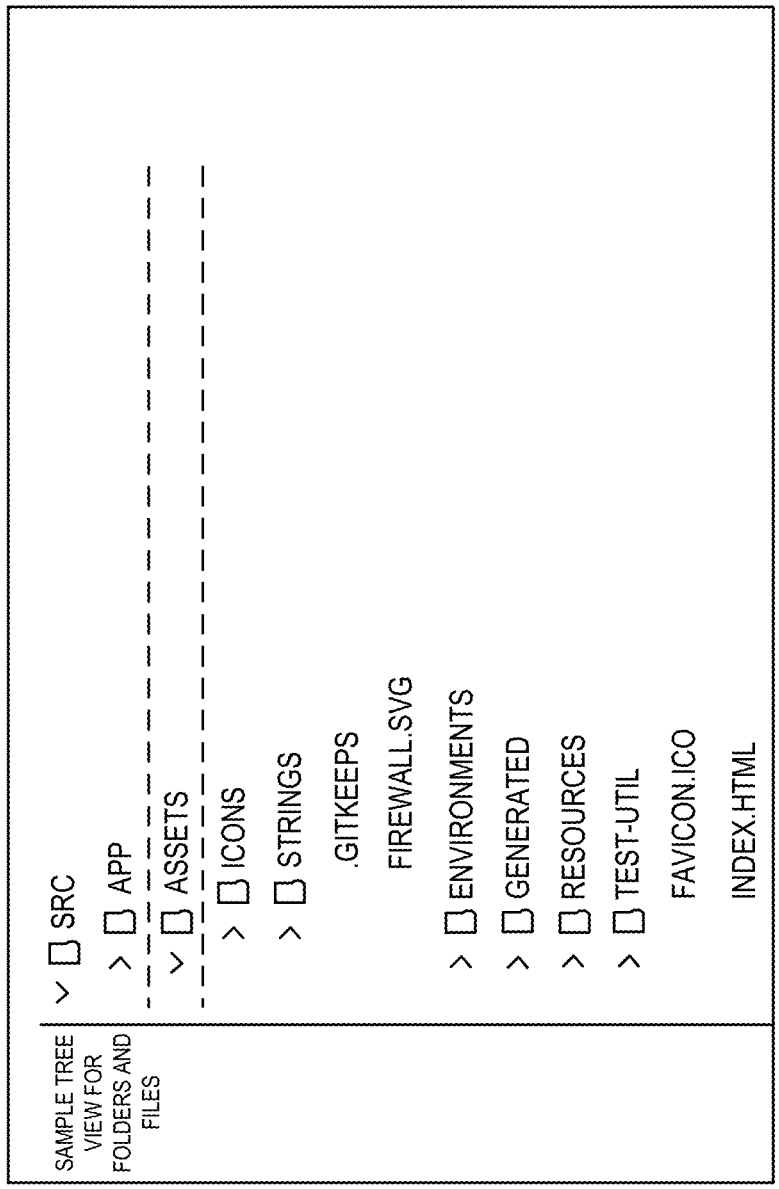
FIG. 8 illustrates another example display of a portion of a multi-dimensional data set as a tree view for folders and files.

FIG. 7 illustrates another example of a portion of a multi-dimensional data set as a tree with collapsible nodes. FIG. 8 illustrates another example of a multi-dimensional data set that is a tree view for folders and files.

Although a tree with collapsible nodes is illustrated in FIG. 5, other types of hierarchical, multi-dimensional data sets may be used in various examples. For instance, the data set may be a multi-dimensional grouping in some example. For instance, a data set may be grouped by state, the grouping within each state may be further grouped by county, and the grouping for each county may be further grouped by city. In some examples, a data set may be key-value pairs rendered as a two-dimensional list with the key as the first dimension, and the value, which may contain a plain list, as the second dimension.

For instance, FIG. 9 illustrates an example of a grouping list view data.

Some examples involve rendering a view on a web UI. In some examples, the method of FIG. 4 may be performed by javascript code in a client-side web UI tool of a web browser. While some examples involve rendering a view on a web UI, in other examples, rendering may be performed in a variety of different contexts, including a user application such as a spreadsheet or the like.

The hierarchical, multi-dimensional data set received in step 481 will be referred to herein as the "data model," and each node in the data model will be referred as a data model node.

As an example, FIG. 10 illustrates an example of sample data for the tree structure illustrated in FIG. 7.

As shown, step 482 occurs next in some examples. At step 482, in some examples, the first root node of the data model is converted into the first item of a view model, and added to the view model being created. In the conversion, in some examples, the data of the node remains the same when converted to the view model item. In some examples, a reference is added to the item in the view model, and the structural information is included as part of the item in the view model. In some examples, the reference acts as a unique identifier for the view model item. The reference may also be used as a means for identifying the start and end of the view port when the view model is rendered. Also, the references may be used to indicate which nodes should be rendered or not rendered—the nodes without references are skipped in the rendering. In some examples, the structural information is a dimension value indicating the dimension of the corresponding node in the data model.

By definition, the root node(s) are the node(s) at the highest level of the hierarchy. The first level of the hierarchy may be referred to as dimension one, the second level of the hierarchy may be referred to as dimension two, and so on. Accordingly, in some examples, at step 482, the first item of the view model is stored with the structural information that the dimension value of the node is one (dimension one).

For instance, in tree 590, node 591 is the root node; accordingly, the first item of the view model would be "Desktop" stored with a reference, and with "Dimension 1" as the structural information.

As shown, decision block 483 occurs next in some examples. At decision block 483, in some examples, a determination is made as to whether the node just converted is expanded. For example, in tree 590, nodes 591, 592, 595, and 599 are expanded, while nodes 593, 594, 596, 597, and 598 are not expanded (i.e., collapsed). In the example illustrated, node 596 cannot be expanded, because node 596 has no children, as can be seen by the fact that there is no expand or collapse icon in front of node 596. In the example shown, nodes 592, 595, and 599 each have an icon 571 indicates that they are expanded nodes. However, in the example shown 591 does not have an icon 571 because it is the root node. In some examples, the root node may have an icon indicating whether or not it is expanded, and in some examples, the root node does not have an icon indicating whether or not it is expanded. In the example shown, nodes 593, 594, 597, and 598 each have icon 572 in front of them, indicating that they are collapsed nodes that are capable of being expanded. Node 599 is an expanded node even though the children node are not included in the view because node 599 is the last node in the view. If the user scrolls down, the children node of node 599 will be visible in the view.

If the determination at decision block 483 is positive, the process proceeds to step 484 in some examples. At step 484, in some examples, the process proceeds to first child node of the node that was last converted. As shown, step 485 occurs next in some examples. At step 485, in some examples, the data model node is converted into a view model item. In some examples, in the conversion, the data of the node remains the same when converted to the view model item. In some examples, a reference is added to the item in the view model, and the structural information is included as part of the item in the view model. In some examples, the structural information is the dimension value of the corresponding node in the data model.

For example, in tree 590, node 591 is at dimension 1, nodes 592 and 599 are at dimension 2, nodes 593-595 and 598 are at dimension 3, and nodes 596 and 597 are at dimension 4. The first level of the hierarchy may be referred to as dimension one, the second level of the hierarchy may be referred to as dimension two, and so on. Accordingly, at step 485, in some examples, the next item of the view model is stored with the structural information of the data model node that is being computed.

For instance, in tree 590, if node 592 is being converted, the next item of the view model would be "Libraries" stored with a corresponding reference and "Dimension 2" as the structural information.

In some examples, the process then proceeds to decision block 483. If the determination at decision block 483 is negative, the process then proceeds to decision block 486 in some examples.

At decision block 486, in some examples, a determination is made as whether there are more sibling nodes at the current hierarchy level that are yet to be converted. If the determination is positive, the process then proceeds to step 487 in some examples.

At step 487, in some examples, the process proceeds to the next sibling node. For example, in tree 590, after node 593 is converted, the process would proceed to the next sibling node after node 593, which is node 594. As shown, block 485 occurs next in some examples.

If the determination at decision block 486 is negative, in some examples, the process then proceeds to block 488, where the process moves up 1 level in the hierarchy. For example, in tree 590, after the process converts node 597, since there are no further sibling nodes to nodes 596 and 597, the process goes from the current level of the hierarchy, level 4 (the level that node 597 is at) to level 3 of the hierarchy. In some examples, the process then proceeds to decision block 489.

At decision block 489, in some examples, a determination is made as to whether the current level in the hierarchy is the first level. If not, the process proceeds to decision block 486 in some examples.

If the determination at decision block 489 is positive, then, in some examples, the process then proceeds to step 431. At step 431, in some examples, the rendering start and end of the view model are determined. In some examples, the rendering start and end of the view model are determined based on the view port location and size, and based on the references assigned to the view models. In some examples, the descendant nodes of a collapsed node are not displayed, and do not have references. The references may be used to determine the start and end of the view model.

For instance, in the example shown in FIG. 5, 591 is the rendering start, and 599 is the rendering end.

As stated above, determination of the rendering start and the rendering end are based on the view port. The initial view by default begins with the first node, so that the first node is the start node in the initial view, unless user-selected settings have selected a different type of view, in which case the initial view will vary based on the settings. As one example of initial view varying based on settings, a data set may have saved the last view of the data set by the user, and the settings may specify that the initial view begins with the user's last view. In this case, the rendering start will be the same rendering start as the rendering start for the saved last view by the user.

The size of view port and the size of each item as rendered in the view port are the used to determine how many items will be rendered in the view port. The view model items to be rendered are the determined number of view model items, beginning with the render start, rendering consecutive view model items having references (skipping view models items with no references).

As shown, step 432 occurs next in some examples. At step 483, in some examples, each view model item from the determined start to the determined end is rendered based on the structural information and data information. For instance, in FIG. 5, the structural information is used to determine the level of indent of each item based on the dimension. The manner in which the dimension is displayed may vary depending on the data structure. For some data structures, the dimension is displayed by the level of indent, with higher dimensions having a correspondingly higher level of indent when displayed.

In some examples, steps 492-499 are the conversion of the hierarchical multi-dimensional data to single-dimensional and steps 431-432 are the single-dimensional view model rendering.

Figure 11:
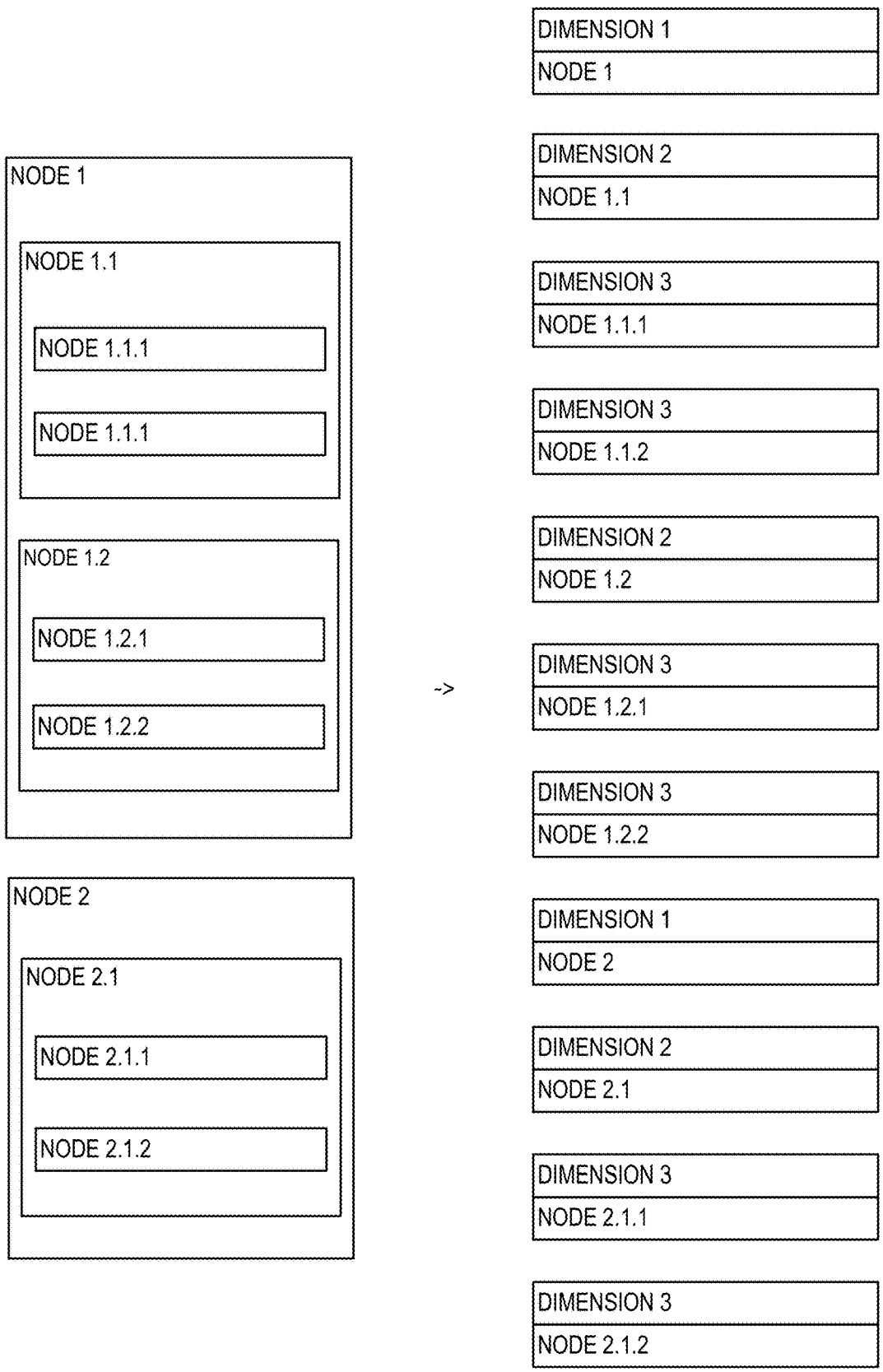
FIG. 11 shows an example of a multi-dimensional to single-dimensional conversion.

FIG. 11 shows an example of the multi-dimensional to single-dimensional conversion.

As shown in the example of FIG. 11, the data information of each node is retained in the conversion, while also storing the structural information as the dimension of corresponding item.

FIG. 12 shows an example "flattened" data that is the of the output of a multi-dimensional to single-dimensional conversion, such as a conversion done by the steps of 492-499 of FIG. 4. FIG. 13 shows an example of html rendering for the flattened data of FIG. 12.

The rendering may easily change based on view changes made by the user. The user may, for example, scroll up, scroll down, page up, page down, go the start (e.g., via a home key), go to the end (e.g., via an end key), or the like. The user might also adjust the size of the view, or the size of text in the view. After such as change, the rendering may quickly be adjusted to the new view by repeating steps 431 and 432, based on the new start and end of the view model after the view changes made by the user.

After a view change, the rendering start and the rendering end of the new view are determined. For example, if the user presses the home key (or Ctrl-Home key combination), the rendering start may be changed to the node with an index of zero, as determined by the reverse lookup data structure. The rendering end may be determined by based on the view port and the view model item indices. As another example, if the user presses the end key (or Ctrl-End key combination), the rendering end is changed to view port model item having the greatest index number, and the rendering start may be determined based on the view port and the view model item indices.

As another example, a next-items action may cause the view to move down a predetermined number of items, such as four items, a number which may be user-adjustable. The rendering end may accordingly be adjusted by adding the number to the index of the current rendering end to get the new rendering end, and determining the number of additional elements prior to the rendering end that should be visible—unless the index of the current rendering end plus the number is greater than the greatest index number, in which case the new rendering end will be the greatest index number when the user causes the next-items action described above.

As another example, an action may cause the view to move up or down a predetermined number of items, such as six items, a number which may be user-adjustable. Determining the new rendering start and new rendering end may be based at least in part on one or more of a previous position (e.g., of a corner, mid-point, border, etc.), a selected currently rendered item, or a focused currently rendered item. As a concrete example, if a selected currently rendered item has index 5, and is rendered with an upper edge 100 pixels from the top of a 1000 pixel height viewport, and that upper edge is intended to remain static, then the new rendering start and end indices may be determined as follows:

```
// current index of note + number of items to jump
newStartIdx = newEndIdx = selectedIdx + 6;
availableTopPixels = 100; // e.g., from current rendering
availableBottomPixels = 1000 – availableTopPixels;
availableBottomPixels –= render_height_of( newEndIdx );
while ((availableTopPixels > 0) && (newStartIdx > 0)) {
        newStartIdx--;
        availableTopPixels -= rendered_height_of( newStartIdx );
}
if (availableTopPixels > 0) {
        availableBottomPixels += availableTopPixels;
}
while ((availableBottomPixels > 0) && (newEndIdx < maxIndex)) {
        newEndIdx++;
        availableBottomPixels -= rendered_height_of( newEndIdx );
}
```

The rendering start and rendering end may be changed in a similar manner based on other changes in the view port.

In some examples, the view model is updated each time the user makes one of the following changes: adds a new node, removes a node, collapses a node, or expands a node. Updating the view model may be accomplished as follows in some examples.

After the initial view model is created, a reverse lookup data structure is ensured to contain (e.g., created new, loaded from cache, updated from an existing, etc.) a list of key-value pairs. For the reverse lookup data structure, the key is the data model node reference, and the value is the index of the related view model item. The reverse lookup data structure may be a dictionary, map, associative array, and/or the like. The reverse lookup data structure is capable of performing one or more operations, including the operation of giving a value for a key.

In some examples, if a new data model node is added, a sub single-dimensional view model is generated. The sub-single dimensional view model is generated as follows in some examples. A separate multi-dimensional data set is created as the new node added, along with any descendent nodes of the new node. This separate subset is converted into a single-dimensional data view model. This single-dimensional date view model is the sub-single dimensional view. Next, the sub-view model is inserted into the main view model.

In some examples, when inserting the sub-view model into the main view model, the parent node index of the new node is first found with the reverse lookup structure. However, in some examples, such as a new root node, the new node may not have a parent node. Also, event callbacks may preclude the need to actively find a parent node when this occurs. Finally, in some examples, rather than finding the parent node, instead a next/previous sibling's index may be found.

In some examples, if a data model node is removed, the related data model item is found based on the reverse lookup data structure. In some examples, the related data model is then removed and the data model items descended from the removed node are removed.

In some examples, when the removed node has a parent node and the parent node has at least one later sibling node, an optimized removal may be accomplished as follows. The multi-dimensional data set is used to find the next sibling of the removed node. Next, reverse lookup data structure is used to find the index of the next sibling of the removed node. Next, removal of the the corresponding node and descendent nodes of the corresponding node from the single-dimensional data set is accomplished by removing each index from the index of the removed node, up to, but not include the index of the next sibling node. Thus, the optimization allows determination of a contiguous set of indices to be removed from the single-dimensional data set.

In some examples, when the removed node has no later sibling, but an ancestor node of the removed node has a later sibling, an optimized removal may be accomplished as follows. The next node not to be removed is found using the multi-dimensional data set. In some examples, the next node not to be removed is found by finding the ancestor node, then finding the ancestor node's next sibling if the ancestor node has a next sibling node, or instead, if the ancestor node has no next sibling node, repeating the process (beginning with finding the ancestor node). Next, the reverse lookup data structure is used to find the index of the of the next node not to be removed. Next, each index from the removed node up to, but not include the index of the next node to not be removed, are removed.

The optimization described above for removing a node may also be applied to collapsing a node, the difference being that the removal does not affected the selected node.

In some examples, if a data model node is expanded, a sub single-dimensional view model is generated. The sub single-dimensional view model is then inserted into the main view model based on the index of the expanded node from the reverse lookup data structure.

In some examples, if a data model node is collapsed, all of the descendant nodes of the collapsed node are removed from the view model.

In some examples, after any of these changes (adding a data model node, removing a data model node, expanding a data model node, or collapsing a data model node), the reverse lookup data structure is updated based on updated view model. Updating the reverse lookup data structure may include renumbered of the indices. For example, if a new view model item is added as the fifth item displayable item in the list, the new view model item may be assigned an index of five, and the view model items previously having an index number of five or greater may each have their index number be increased by one.

Updating the reverse lookup data structure may also include ensuring that the reverse lookup data structure corresponds to the single-dimensional data set. For example, in the case of adding a node, it is ensured that the new node and any descendants of the new nodes are added to the reverse lookup data structure. In some examples, in the case removing a node, it is ensured that the removed node and any descendants of the removed node are removed from the reverse lookup data structure. In some examples, in the case of collapsing a node, it is ensured that descendent nodes of the collapsed node do not have indices in the reverse lookup data structure. In the case of an expanded node, it is ensured that children node of the expanded node have indices in the reverse lookup data structure.

In some examples, lazy loading may be used. For example, if a node is collapsed, the data for the descendant nodes of the collapsed node might not be downloaded until the user expands the node.

Figure 14:
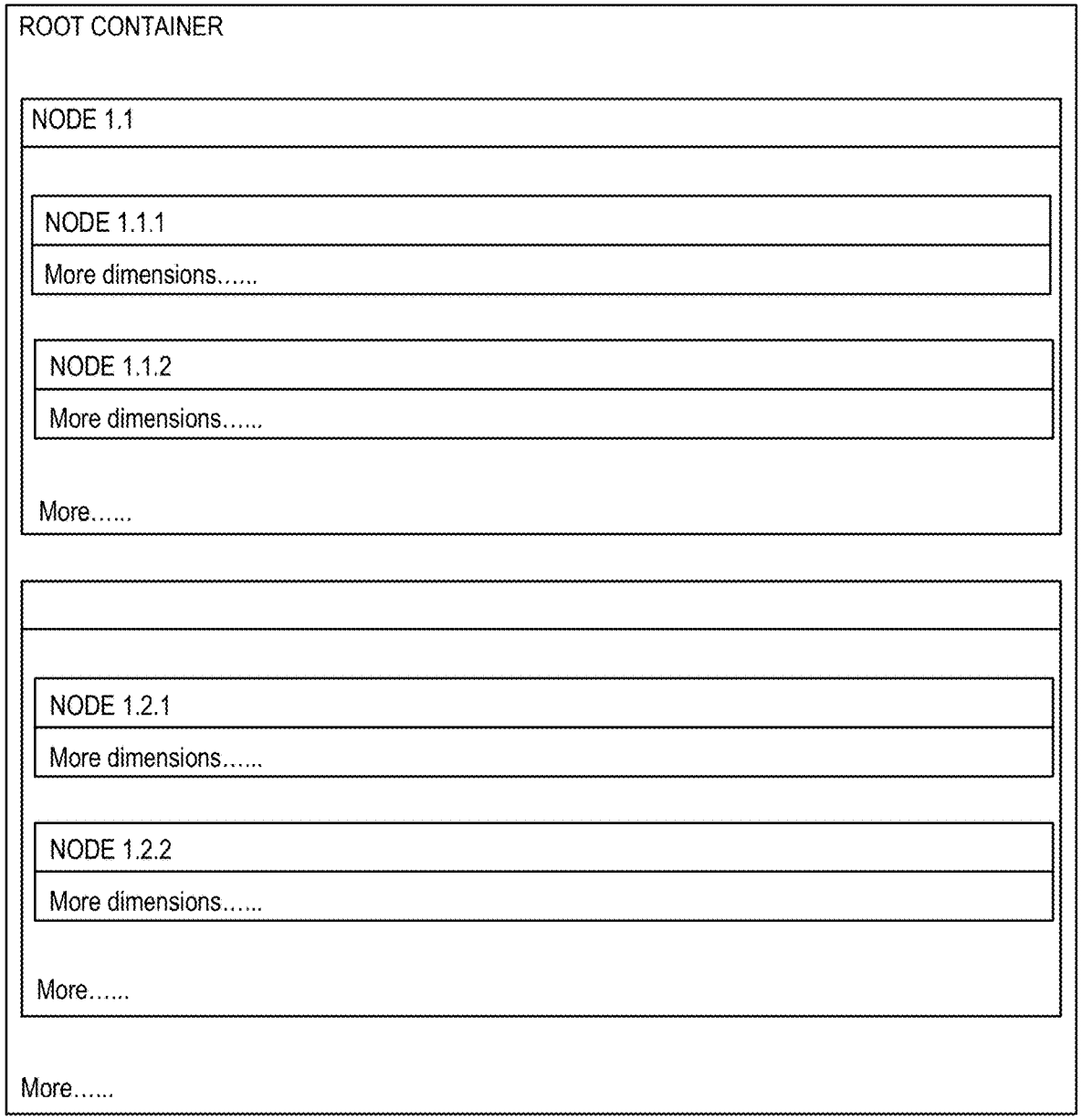
FIG. 14 show an instance of multiple-dimension data rendering.

Conventionally, when multiple-dimensional data is rendered, the rendering may be accomplished by mapping the HTML structure to the data structure, as illustrated in FIG. 14.

However, this conventional method may have difficulties when rendered with UI virtualization for large-volume multi-dimensional data, due to, for example, problems in calculating which part of the data should be rendered in the viewport. Based on the viewport location, it may be very difficult to calculate which node should be the first one to show up in the viewport, due to the nested structure of the large-volume multi-dimensional data. Similarly, based on the viewport size, it may be very difficult to calculate which node should be the last one to show up in the viewport. The node might be in any dimension and any position.

Also, with this conventional method, when the data is updated, typically the UI needs to be updated, and the start and end of data rendering need to be recalculated based on viewport, which is typically very difficult with large-volume multi-dimensional data. Additionally, when the user needs to directly navigate to a certain node, e.g. move to previous/next/first/last node, it is typically difficult to calculate where is the node for large-volume multi-dimensional data. The node may be next to the current node in the same dimension or in another dimension. Further, even when data is not presented in the view, there is a corresponding document object model (DOM) object to create the data. These difficulties may cause performance issues, crashing, and/or other issues.

Examples of the method of FIG. 4 may provide for easy calculation of the data rendering based on viewport, easy handling of the UI updating based on incremental updating of the view model, and easy navigation to any nodes in the structural data.

Figure 6:
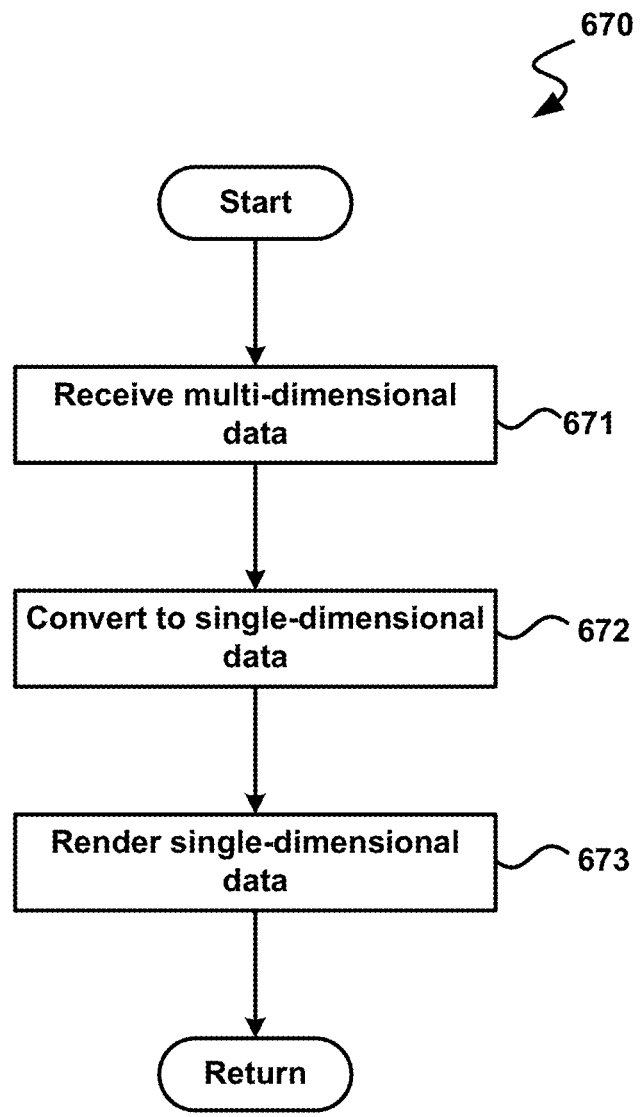
FIG. 6 is an example dataflow for an example of the process of FIG. 4.

FIG. 6 is an example dataflow for a process (670), which may be employed as an example of process 480 of FIG. 5.

In the illustrated example, step 671 occurs first. At step 671, in some examples, a multi-dimensional data set is received. As shown, step 672 occurs next in some examples. At step 672, in some examples, the multi-dimensional data set is converted into a single-dimensional data set that includes structural information associated with the multi-dimensional data set, such that the root nodes and each node in the single-dimensional node for which each ancestor node of the node is an expanded node is assigned a reference. Equivalently, each node that is not a descendent node of a collapsed node is assigned a reference.

As shown, step 673 occurs next in some examples. At step 673, in some examples, a view is caused to be displayed, including using the single-dimensional data set to render at least a selected portion of the single-dimensional data set.

The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
converting a multi-dimensional data set into a single-dimensional data set that includes structural information associated with the multi-dimensional data set, such that root nodes and each node in the single-dimensional node for which each ancestor node of the node is an expanded node is assigned a reference; and
causing a view to be displayed, including using the single-dimensional data set to render at least a selected portion of the single-dimensional data set, such that the rendering is based, at least in part, on the structural information, and such that single-dimensional nodes in the single-dimensional data set lacking references are skipped.

2. The apparatus of claim 1, wherein the structural information includes a dimension value for each node in the single-dimensional data set that is not a descendant of a collapsed node.

3. The apparatus of claim 1, the actions further including:
creating a reverse lookup data structure based on the single-dimensional data set such that the reverse lookup data structure uses key-value pairs in which, for each key-value pair, the key is the reference, and the value is an index of a corresponding item in the single-dimensional data set.

4. The apparatus of claim 3, the actions further including, in response to adding a new node to the multi-dimensional data set:
generating a sub single-dimensional view model;
inserting the sub single-dimensional view model in the single-dimensional data set; and
after inserting the sub single-dimensional view model in the single-dimensional data set, ensuring that the reverse lookup data structure corresponds to the single-dimensional data set.

5. The apparatus of claim 3, the actions further including, in response to removing a node from the multi-dimensional data set:
using the reverse lookup data structure to find a corresponding node in the single-dimensional data set;
removing the corresponding node from the single-dimensional data set;
removing the descendent nodes of the removed node from the single-dimensional data set; and
after removing the descendent nodes, ensuring that the reverse lookup data structure corresponds to the single-dimensional data set.

6. The apparatus of claim 3, the actions further including, in response to expanding a node in the single-dimensional data set:
generating a sub single-dimensional view;
inserting the sub single-dimensional view into the single-dimensional data set based on the index of the expanded node in the reverse lookup data structure; and
after inserting the sub single-dimensional view, ensuring that the reverse lookup data structure corresponds to the single-dimensional data set.

7. The apparatus of claim 3, where the actions further include, in response to collapsing a node in the single-dimensional data set:
removing each descendant node of the collapsed node from the single-dimensional data set; and
after removing each descendant node of the collapsed node, ensuring that the reverse lookup data structure corresponds to the single-dimensional data set.

8. The apparatus of claim 1, wherein using the single-dimensional set to render at least a selected portion of the single-dimensional data includes:
determining a start and an end of the data in the single-dimensional data to be displayed; and
rendering each item from the determined start to the determined end.

9. The apparatus of claim 8, wherein determining the start and the end of the data to be displayed is accomplished using the references of the single-dimensional set, a view port location, and a view port size.

10. The apparatus of claim 8, wherein the actions further include, in response to a change in the view port, determining a start and an end of the data to be displayed in the changed viewport, and rendering each item from the determined start of the changed view port to the determined end of the changed view port.

11. A method, comprising:
via at least one processor, converting a multi-dimensional data model into a single-dimensional view model that includes structural information associated with the multi-dimensional data model, such that, in the single-dimensional view model, root nodes and each node in the single-dimensional node for which each ancestor node of the node is an expanded node is assigned a reference; and
causing a view to be displayed, including using the single-dimensional view model to render at least a selected portion of the single-dimensional view model, such that the rendering is based, at least in part, on the structural information, and such that single-dimensional nodes in the single-dimensional view model lacking references are skipped.

12. The method of claim ii, wherein the structural information includes a dimension value for each node in the single-dimensional view model that is not a descendant of a collapsed node.

13. The method of claim ii, further comprising:
creating a reverse lookup data structure based on the single-dimensional view model such that the reverse lookup data structure uses key-value pairs in which, for each key-value pair, the key is the reference, and the value is an index of a corresponding item in the single-dimensional view model.

14. The method of claim ii, wherein using the single-dimensional set to render at least a selected portion of the single-dimensional data includes:
determining a start and an end of the data in the single-dimensional view model to be displayed; and
rendering each item from the determined start to the determined end.

15. The method of claim 14, further comprising, in response to a change in the view port, determining a start and an end of the data to be displayed in the changed viewport, and rendering each item from the determined start of the changed view port to the determined end of the changed view port.

16. A processor-readable storage medium, having stored thereon process-executable code that, upon execution by at least one processor, enables actions, comprising:
converting a multi-dimensional data set into a single-dimensional data set that includes structural information associated with the multi-dimensional data set, such that each node in the single-dimensional node that is not a descendant node of a collapsed node is assigned a reference; and
rendering at least a selected portion of the single-dimensional data set.

17. The processor-readable storage medium of claim 16, wherein the structural information includes a dimension value for each node in the single-dimensional data set that is not a descendant of a collapsed node.

18. The processor-readable storage medium of claim 16, the actions further comprising:
creating a reverse lookup data structure based on the single-dimensional data set such that the reverse lookup data structure uses key-value pairs in which, for each key-value pair, the key is the reference, and the value is an index of a corresponding item in the single-dimensional data set.

19. The processor-readable storage medium of claim 16, wherein rendering at least a selected portion of the single-dimensional data includes:

determining a start and an end of the data in the single-dimensional data to be displayed; and rendering each item from the determined start to the determined end.

20. The processor-readable storage medium of claim 19, actions further comprising, in response to a change in the view port, determining a start and an end of the data to be displayed in the changed viewport, and rendering each item from the determined start of the changed view port to the determined end of the changed view port.

\* \* \* \* \*